(12) United States Patent
MacDowall et al.

(10) Patent No.: US 6,866,699 B2
(45) Date of Patent: Mar. 15, 2005

(54) PROCESS FOR THE ADSORPTION OF ORGANIC VAPOURS FROM GAS MIXTURES CONTAINING THEM

(75) Inventors: James Duff MacDowall, Glasgow (GB); Dirk van de Kleut, Hoogland (NL); Michiel Trijnisse Kleij, Leusden (NL)

(73) Assignee: Norit Nederland B.V., Amersfoort (NL)

( * ) Notice: Subject to any disclaimer, the term of this patent is extended or adjusted under 35 U.S.C. 154(b) by 0 days.

(21) Appl. No.: 10/204,297

(22) PCT Filed: Feb. 20, 2001

(86) PCT No.: PCT/NL01/00146

§ 371 (c)(1),
(2), (4) Date: Oct. 17, 2002

(87) PCT Pub. No.: WO01/62367

PCT Pub. Date: Aug. 30, 2001

(65) Prior Publication Data

US 2003/0101867 A1 Jun. 5, 2003

(30) Foreign Application Priority Data

Feb. 22, 2000 (EP) ............................................. 00200608

(51) Int. Cl.⁷ .............................................. B01D 53/04
(52) U.S. Cl. .............................. 95/143; 95/146; 95/148; 55/385.3
(58) Field of Search .............................. 55/385.1, 385.3; 95/143, 146, 148, 901; 96/131, 132

(56) References Cited

U.S. PATENT DOCUMENTS

| | | | | |
|---|---|---|---|---|
| 3,844,739 A | | 10/1974 | Alfrey | |
| 3,944,403 A | * | 3/1976 | Simpson et al. | 96/131 |
| 4,059,409 A | * | 11/1977 | Barto et al. | 422/169 |
| 4,964,888 A | | 10/1990 | Miller | |
| 5,207,808 A | * | 5/1993 | Haruta et al. | 96/131 |
| 5,395,428 A | * | 3/1995 | von Blucher et al. | 95/104 |
| 5,510,063 A | * | 4/1996 | Gadkaree et al. | 264/29.7 |
| 5,769,928 A | * | 6/1998 | Leavitt | 95/95 |
| 5,914,457 A | * | 6/1999 | Itakura et al. | 96/130 |
| 5,948,142 A | * | 9/1999 | Holmes et al. | 95/99 |
| 6,152,991 A | * | 11/2000 | Ackley | 95/96 |
| 6,171,373 B1 | * | 1/2001 | Park et al. | 95/138 |
| 2001/0015134 A1 | * | 8/2001 | Uchino et al. | 96/130 |
| 2001/0020418 A1 | * | 9/2001 | Yamafuji et al. | 96/130 |
| 2002/0073847 A1 | * | 6/2002 | Sheline et al. | 95/143 |
| 2002/0124732 A1 | * | 9/2002 | Hara et al. | 96/131 |

FOREIGN PATENT DOCUMENTS

| | | |
|---|---|---|
| DE | 197 08 692 A1 | 3/1998 |
| GB | 2 300 577 | 11/1996 |
| WO | WO 92 01585 | 2/1992 |

OTHER PUBLICATIONS

* Kirk–Othmer Encyclopedia of Chemical Technology. Fourth edition. vol. 4: 1992, John Wiley & Sons, New York. XP002143167. pp. 1030–1031.

* cited by examiner

Primary Examiner—Robert H. Spitzer
(74) Attorney, Agent, or Firm—Weingarten, Schurgin, Gagnebin & Lebovici LLP

(57) ABSTRACT

The invention is directed to a process for the adsorption of organic vapours from gas mixtures containing them onto activated carbon, where the process comprises passing the gas mixture consecutively through at least a first and a second adsorption system, the first system consisting of activated carbon having a first adsorption rate for the organic vapours and the second system consisting of an adsorbent having a second adsorption rate for the organic vapours, the second adsorption rate being higher than the first adsorption rate, more in particular to such process when used in the operation of vehicle internal combustion engines.

28 Claims, 2 Drawing Sheets

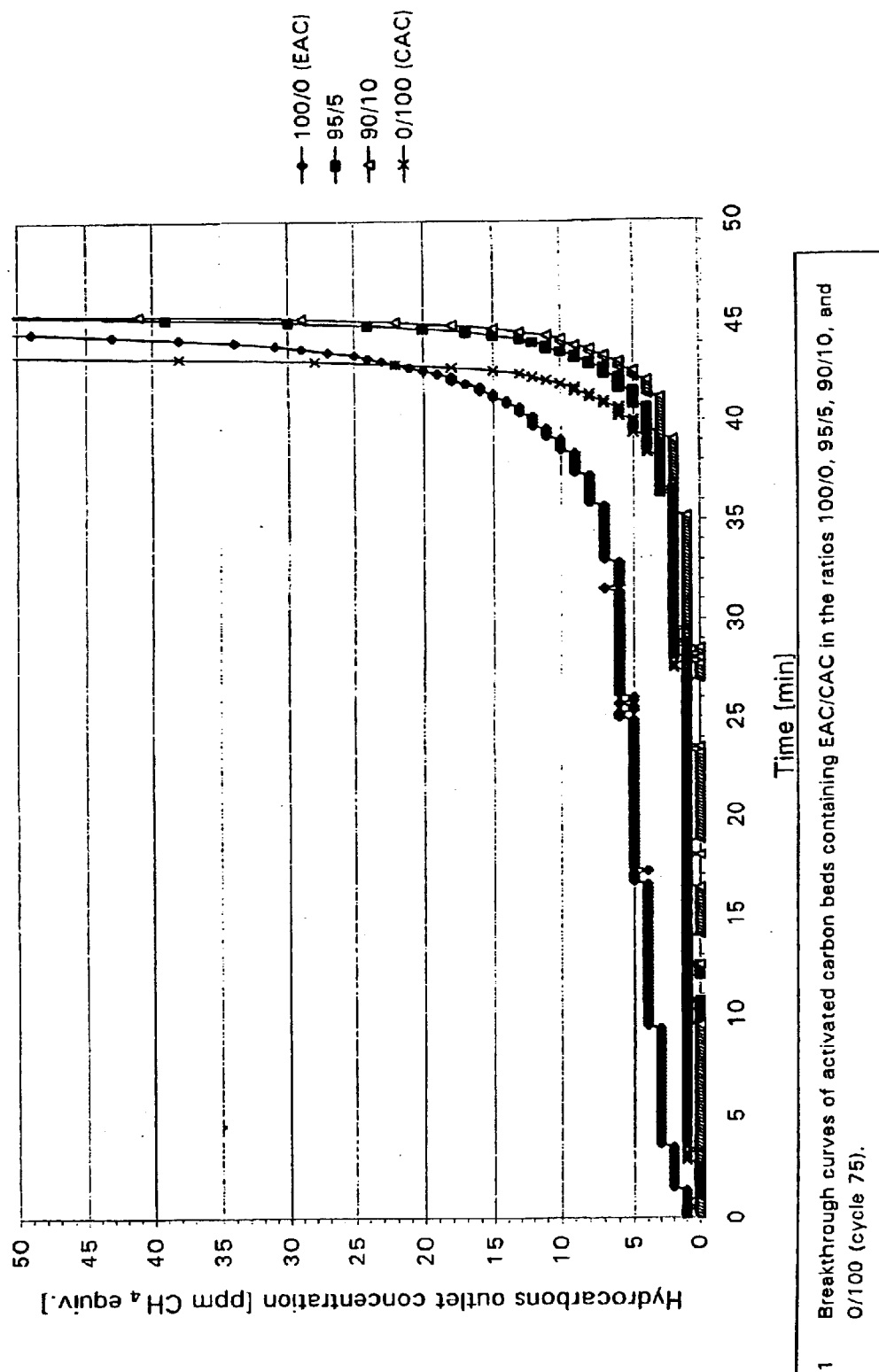
Figure 1 Breakthrough curves of activated carbon beds containing EAC/CAC in the ratios 100/0, 95/5, 90/10, and 0/100 (cycle 75).

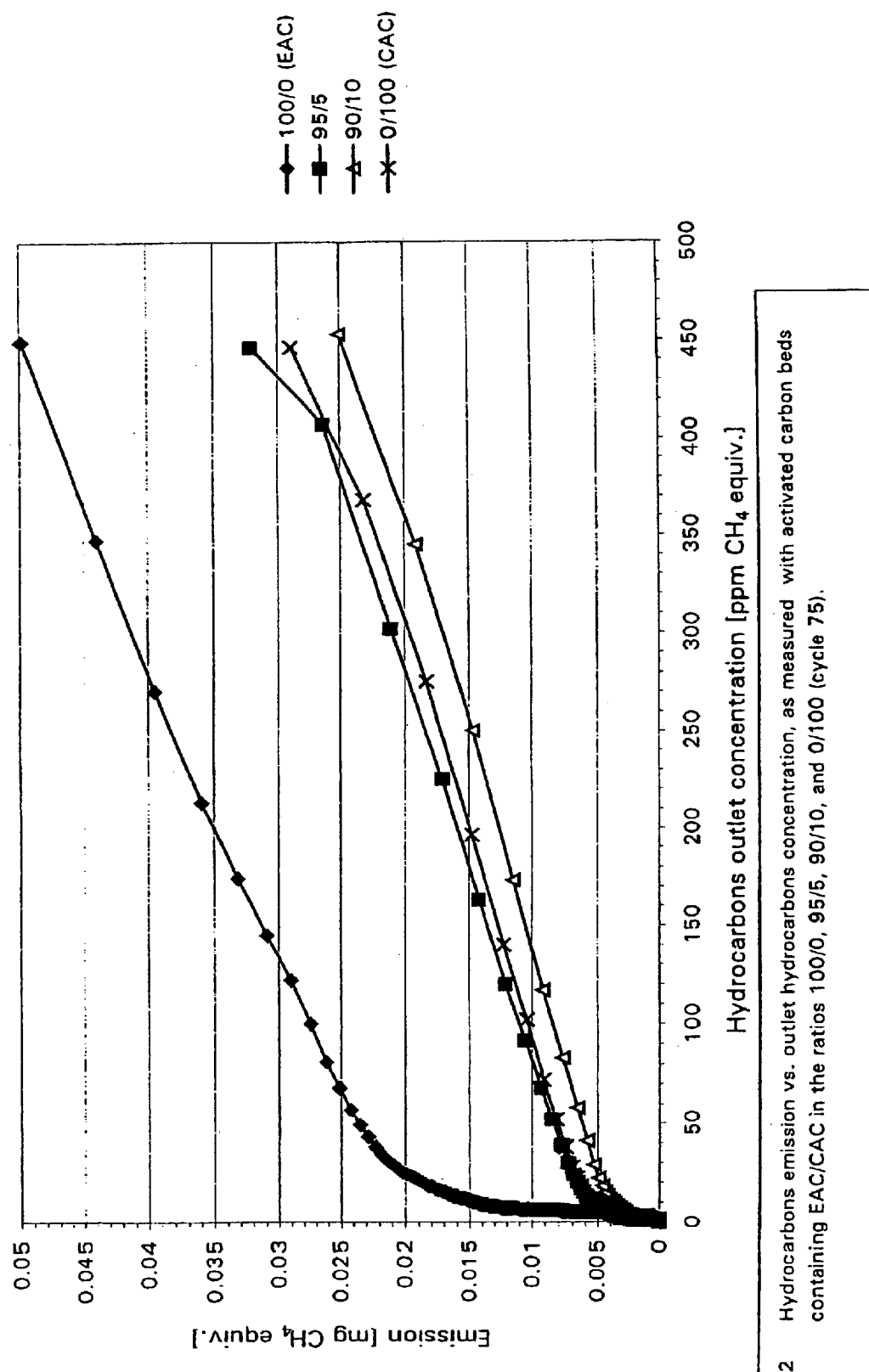
Figure 2  Hydrocarbons emission vs. outlet hydrocarbons concentration, as measured with activated carbon beds containing EAC/CAC in the ratios 100/0, 95/5, 90/10, and 0/100 (cycle 75).

PROCESS FOR THE ADSORPTION OF ORGANIC VAPOURS FROM GAS MIXTURES CONTAINING THEM

The invention is directed to a process for the adsorption of organic vapours from gas mixtures containing them onto activated carbon.

Emission of organic vapours is harmful to the environment (smog). The emission from automotive sources is regulated by law worldwide, requiring car manufacturers to take measures to reduce the emission of fuel vapours from the fuel tanks during operation or refueling or during periods when the car is not driving, for example due to the temperature changes (day-night).

These emission reduction systems are based on activated carbon and are regenerated during vehicle operation, when combustion air is passed through the system, thereby removing the fuel from the activated carbon. These systems are known as evaporative loss control devices (ELCD-canister). Also it can be useful in stationary systems to apply activated carbon for removing organic vapours from gas mixtures. Examples are in the area of heating devices and such like.

Current emission limits have resulted in the use of special canisters containing specialised types of activated carbon, that are well suited to reduce the emission sufficiently. In the near future the emission limits will be reduced drastically; these levels cannot be met by current systems, especially not during refuelling. In that situation, not all vapours are adsorbed sufficiently fast and bleed through occurs. Increasing the adsorption capacity of the canister by increasing its size is not acceptable, since the available space for incorporating these canisters in a car is limited. Increase of the adsorption capacity per unit carbon volume can only be accomplished at high costs and still the adsorption rate will be insufficient.

A solution would be to increase the adsorption kinetics (adsorption rate), however, the common way to do that results in other problems. Usually this is done by decreasing the particle size of the adsorbent, but this results in an increase in pressure drop, which makes it difficult to properly refill the gasoline tank, i.e. without untimely stopping of the gasoline pump of the service station. An other alternative is to change the external surface area to volume ratio (Sv, with dimension of e.g. $m^2/m^3$) of the adsorbent particles by selecting a different external shape. The consequence of this is a smaller amount of adsorbent in the same volume (i.e. a decrease in density), which is not acceptable, as the total adsorption capacity decreases.

Accordingly it is an object of the present invention to provide a process for the adsorption of organic vapours, in particular organic vapours (hydrocarbons) that are held responsible for smog formation, from gas mixtures containing them onto activated carbon, which process does not have the drawbacks described above. In the present description and claims, organic compounds that are held responsible for smog formation are gaseous compounds originating from fuels and are particularly defined as hydrocarbons having more than three carbon atoms. More in particular these compounds are present in the vapours of fuels such as gasoline, kerosene or fuel oil.

The process of the present invention should be suitable for application in ELCD-canisters. A further object is to provide for an improvement in this respect, i.e. to provide an ELCD-canister which enables a decrease of the emission of smog-forming hydrocarbons, without a significant increase in the pressure drop across the canister and without a significant decrease in the canister's adsorption capacity.

According to the invention the process comprises passing the gas mixture consecutively through at least a first and a second adsorption system, the first system consisting of activated carbon having a first adsorption rate for the organic vapours and the second system consisting of an adsorbent having a second adsorption rate for the organic vapours, the second adsorption rate being higher than the first adsorption rate.

In a preferred embodiment said process is applied to automotive systems, wherein the adsorption system is operated in relation to an internal combustion engine.

The present invention is based on the surprising insight, that by the use of two consecutive adsorption systems with comparable adsorption capacities per unit volume, a first one having a limited adsorption rate and preferably a low pressure drop, and a second one having a higher adsorption rate, the emission can be decreased, without having to resort to other measures, such as increasing the size of the (standard) adsorption canisters, to eliminate the bleed through.

By the use of this system of at least two combined adsorbents having different adsorption kinetics, a better use of the available adsorption capacity is made, without an undue increase of canister size or pressure drop over the system.

According to the invention it was thus found that a canister containing a limited amount of adsorbent with fast adsorption kinetics at the outlet side of a regular canister already provides an improved reduction in emission. Apparently, the mass transfer zone obtained in the downstream adsorbent, preferably an activated carbon or zeolite bed, was reduced in size in this downstream section, thus increasing the efficiency.

In a preferred embodiment the present invention comprises the use of an activated carbon filter containing
1. activated carbon having a relatively low pressure drop and a high adsorption capacity per unit volume but limited adsorption kinetics, combined with
2. a second activated carbon with higher adsorption kinetics, for example by using smaller particles or other particle shapes.

The combining of both materials in a regular ELCD-canister ensures that the best aspects of both options are combined. The high adsorption capacity and low pressure drop of the regular carbon is combined with the fast kinetics of the downstream carbon. Since the carbon with the fast adsorption kinetics is placed at the outlet of the canister the bleeding of vapour is minimized. Accordingly, the amount of downstream carbon with higher adsorption kinetics is limited compared to the amount of regular carbon, thereby minimizing the pressure drop over the complete filter.

In the operation of the present invention there are various possibilities for the application thereof. In a first, preferred, embodiment, both adsorbents are placed in the same canister, either in direct contact with each other or separated by a grid, giving a single adsorbent bed, containing two different adsorbents with different properties as discussed above. It is also possible to place each adsorbent in a separate canister, the canisters being mutually connected all the time. In a third embodiment it is possible to place both adsorbents in separate canisters or separate sections of a single canister, which are connected to each other using valves which allow the gasoline vapours to enter the second, downstream canister or canister section only when required.

As indicated above, the present invention is based on the use of two different adsorbents, the first one being a regular activated carbon. As second adsorbent it is possible to use activated carbon, but one can also use other adsorbing materials which can be regenerated by passing the air that is used in the internal combustion engine through the adsorbent. Preferred materials are activated carbon and zeolites. In case of use of activated carbon as second adsorbent, it is to be noted that this must have different adsorption kinetics from the first carbon. This can for example be realized by using the same activated carbon as in the first adsorbent, but having different surface to volume ratio, thereby changing the diffusion characteristics of the activated carbon. One possibility is to make the particle size of the carbon smaller, whereas another possibility is to change the outer shape, for example using specifically shaped extrudates or tablets. Another possibility to improve the adsorption kinetics is to select a carbon type with a more optimal pore size distribution, thus improving the diffusion characteristics. A third possibility is the use of fibrous activated carbon, e.g. activated carbon felts or cloths, or the use of activated carbon containing fibrous materials, which exhibit high adsorption kinetics combined with a low pressure drop and a relatively low adsorption capacity.

For practical purposes, it is preferred to use extruded activated carbon (EAC) as the particles having a low Sv and granular activated carbon (GAC) as the particles with the high Sv. Preferably, EAC having a Sv of about 1250–7000 $m^2/m^3$, more preferably 2000–3250 $m^2/m^3$ is used. The Sv of the GAC particles is preferably from 2000–30 000 $m^2/m^3$, more preferably from 3000–12 000 $m^2/m^3$.

According to the invention, the amount of adsorbents is selected such, that the adsorption capacity for gasoline vapour of the first adsorption system is larger than the adsorption capacity of gasoline vapour of the second adsorption system. Generally, this means that the amount, by weight, of the second adsorbent will be lower than the amount, by weight, of the first adsorbent.

As indicated above, the present invention is applicable for the adsorption of organic vapours from gas mixtures, more in particular for the removal of gasoline or fuel oil vapours from gas mixtures originating in relation to the operation of vehicle internal combustion engines. Although the main application of the invention certainly lies in the so-called evaporative loss control devices (ELCD-canisters) which are designed to prevent emission of gasoline and fuel oil vapours caused by "breathing" of gasoline and fuel oil tanks, it is also possible to use the invention in relation to stationary tanks containing organic materials having a measurable vapour pressure at ambient temperature, such as tanks for gasoline, fuel oil, kerosene and naphtha.

BRIEF DESCRIPTION OF THE DRAWINGS

FIG. 1 shows breakthrough curves of activated carbon beds containing EAC and GAC particles in ratios 95/5 and 90/10 (according to the invention) and 100/0 and 0/100 (reference), respectively.

FIG. 2 shows hydrocarbons emission vs. outlet hydrocarbons concentration, as measured with activated carbon beds containing EAC and GAC particles in ratios 95/5 and 90/10 (according to the invention) and 100/0 and 0/100 (reference), respectively.

The present invention is now elucidated on the basis of three examples.

COMPARATIVE EXAMPLE

A standard evaporative loss control device canister, containing activated carbon, 2 mm/diameter extrudate was used and the emission in the "three day diurnal test" (US-EPA test procedure) was determined. The emission value obtained was set as 100%.

EXAMPLE 1

Using the same method as in the comparative example, the emission was determined of the same ELCD canister, containing 80% (by weight) activated carbon, 2 mm/diameter extrudates and 20% by weight granular activated carbon (sieve fraction 0.5–2.0 mm), downstream from the extrudate was used. In the same test procedure as used in the comparative example the emission was determined. The emission values obtained were 30% of the values obtained in the comparative example.

EXAMPLE 2

The performance of activated carbon for evaporative loss control was tested in a dedicated, automated test apparatus, in which a carbon bed is loaded with a model gasoline vapour and regenerated with air during various cycles. The applied test is a simulation of the conditions that are imposed on the carbon in an ELCD canister in practise.

The diameter of the test tube containing the carbon bed was 3.6 cm. The carbon bed height was always 15 cm, resulting in a total carbon volume of 153 $cm^3$. The test tube was placed in a thermostatically controlled chamber at a temperature of 30° C. during the complete test.

The model gasoline vapour consisted of 50 vol % air, 33 vol % butane and 17 vol % of a mixture of various hydrocarbons (HC-mix). The composition of this HC-mix is presented in Table 1.

The contact time in the carbon bed was 75 seconds during each loading step. The total hydrocarbons concentration in the off-gas was measured every 10 seconds during the complete loading step using a flame ionisation detector (FID). The loading step was immediately stopped and the regeneration step was started once the measured FID-signal became higher than the FID-signal corresponding to 440 ppmv methane. The time required to reach this signal is taken as the loading time. The hydrocarbons concentration as measured by the FID is expressed as ppm methane equivalent, indicating the methane concentration giving the same FID-signal.

Regeneration was always performed in counter-flow (downstream) during 16 minutes, using 300 bed volumes of dry air.

Part of an extruded activated carbon sample (2 mm diameter) was crushed and sieved to obtain a sieve fraction containing particles between 1–2 mm in diameter. The surface to volume ratio (Sv) of these particles was 4000 $m^2/m^3$. This sieve fraction is indicated as granular activated carbon (GAC) hereafter. A multi-layer carbon bed was created by filling the test tube with extruded activated carbon (EAC, having an Sv of 2400 $m^2/m^3$) first, after which an additional layer of GAC was added in such a way that the total activated carbon bed volume remained unchanged (153 $cm^3$). The ratio EAC/GAC was varied as follows: 100/0, 95/5, 90/10, 0/100.

After the performance test the pressure drop in air over the carbon beds described above was measured at various linear flow rates.

By default, each carbon bed was tested for 75 loading and regeneration cycles under identical test conditions.

The gasoline working capacity (GWC) is defined as the effective adsorption capacity for hydrocarbons under the mentioned test conditions. The GWC was calculated for each cycle as follows.

$$GWC = \frac{(Loading\ Time) \cdot (HC\ Supply\ Rate)}{1000 \cdot (Carbon\ Volume)} [g/100\ ml]$$

Due to ageing the GWC usually slightly decreases in time. The results obtained in cycle 75 are assumed to represent the performance after aging of the carbon and are the most close to a steady state situation in practise.

The outlet hydrocarbons concentration was registered as a function of time in order to establish the emitted amount of hydrocarbons during the loading step of the carbon. These data resulted in the so-called breakthrough curves for each loading step. By integration of the breakthrough curves the total amount of emitted hydrocarbons was established.

In FIG. 1 the breakthrough curves in cycle 75 are presented for the various carbon beds described above, containing EAC/GAC in the ratios 100/0, 95/5, 90/10, and 0/100. FIG. 1 clearly shows that the hydrocarbons concentration in the off-gas with EAC only is at a much higher level than that observed with GAC only, thus resulting in higher total emission values. It follows that the adsorption rate of the GAC particles is higher than the adsorption rate of the EAC particles Also the multi-layer carbon beds, containing a certain fraction GAC at the outlet side of the carbon bed, show a low hydrocarbons concentration in the off-gas. Furthermore, breakthrough of the 95/5 and 90/10 beds occurred later than with the 100/0 and 0/100 beds.

Table 2 contains the loading times in cycle 75 established using the mentioned carbon beds, relative to the loading time of the carbon bed containing EAC only. These data indicate that the total loading times of the multi-layer carbon beds are at least as long as that of the carbon bed containing EAC. This shows that the performance of the carbon bed (GWC) is not affected in a negative way by applying a multi-layer bed. The shorter loading time of the GAC bed primarily resulted from the lower packed density of this carbon compared to EAC, thus reducing the amount of activated carbon in the test tube.

FIG. 2 represents the test results of cycle 75 after integrating the breakthrough curves. It shows the cumulative hydrocarbons emission as a function of the outlet hydrocarbons concentration. From FIG. 2 it follows that the hydrocarbons emission for a multi-layer carbon bed is at the same level as that of a bed filled with GAC only, and at a much lower level than that of a bed filled with EAC only.

Table 3 contains the pressure drop data in air over the carbon beds at various linear gas flow rates. These data indicate that the pressure drop of the multi-layer carbon bed is only slightly higher than that of a carbon bed containing only EAC, and considerably lower than that of a carbon bed containing GAC only.

TABLE 1

Composition of the HC-mix used to compose a model gasoline vapour.

| Hydrocarbon Compound | Content in HC-mix [mole fraction] |
| --- | --- |
| n-pentane | 0.579 |
| n-hexane | 0.077 |
| 1-hexene | 0.050 |
| benzene | 0.013 |
| toluene | 0.053 |

TABLE 1-continued

Composition of the HC-mix used to compose a model gasoline vapour.

| Hydrocarbon Compound | Content in HC-mix [mole fraction] |
| --- | --- |
| 2,3 di-methylpentane | 0.017 |
| iso-octane | 0.043 |
| ethylbenzene | 0.017 |
| o-xylene | 0.014 |
| nonane | 0.006 |
| MTBE | 0.131 |

TABLE 2

Loading times during cycle 75 of carbon beds containing different amounts of EAC and GAC.

| Carbon Bed Composition [ratio EAC/GAC] | Loading Time/Loading Time using EAC only [%] |
| --- | --- |
| 100/0 | 100.0 |
| 95/5 | 100.7 |
| 90/10 | 100.4 |
| 0/100 | 96.1 |

TABLE 3

Pressure drop in air over carbons beds containing different amounts of EAC and GAC.

| | Pressure Drop in Air [kPa/m] | | |
| --- | --- | --- | --- |
| Linear Air Flow Rate [cm/sec] | EAC/GAC-ratio 100/0 | EAC/GAC-ratio 90/10 | EAC/GAC-ratio 0/100 |
| 7.7 | 0.4 | 0.5 | 1.2 |
| 15 | 1.3 | 1.7 | 3.1 |
| 23 | 2.4 | 3.0 | 5.4 |
| 31 | 3.7 | 4.6 | 8.5 |
| 38 | 5.7 | 6.9 | 12 |
| 46 | 7.7 | 9.2 | 17 |
| 54 | 11 | 12 | 21 |
| 61 | 14 | 17 | 27 |
| 69 | 17 | 20 | 34 |

What is claimed is:

1. Process for the adsorption of smog-forming hydrocarbon vapours from fuel gas mixtures containing them onto activated carbon, said process comprising passing the gas mixture consecutively through at least a first and a second adsorption system, the first system consisting of extrudated activated carbon (EAC) having a first adsorption rate for organic vapours and the second system consisting of activated carbon having a second adsorption rate for organic vapours, the second adsorption rate being higher than the first adsorption rate.

2. Process according to claim 1, wherein said EAC has an Sv of 1250–7000 $m^2/m^3$.

3. Process according to claim 2, wherein the particle size of the activated carbon in said second adsorption system is smaller than the particle size of the activated carbon in said first adsorption system.

4. Process according to claim 2, wherein said activated carbon from said second system has an Sv of 2000–30,000 $m^2/m^3$.

5. Process according to claim 4, wherein:
   the activated carbon in both adsorption systems is based on the same material, with different ratio of external surface to volume;

the particle size of the activated carbon in said second adsorption system is smaller than the particle size of the activated carbon in said first adsorption system;

the pressure drop per unit bed depth of the adsorbent in said first adsorption system is lower than the pressure drop per unit bed depth of the adsorbent in said second adsorption system; and said fuel gas mixtures are selected from gases originating from gasoline, kerosene or fuel oil.

6. Process according to claim 1, wherein said activated carbon for the second system has an Sv of 2000–30,000 $m^2/m^3$.

7. Process according to claim 6, wherein the activated carbon in both adsorption systems is based on the same material, with different ratio of external surface to volume.

8. Process according to claim 1, wherein the pressure drop per unit bed depth of the adsorbent in said first adsorption system is lower than the pressure drop per unit bed depth of the adsorbent in said second adsorption system.

9. Process according to claim 1, wherein said fuel gas mixtures are selected from gases originating from gasoline, kerosine and fuel oil.

10. Process according to claim 1, wherein said activated carbon of the second system is granular.

11. Process for the removal of gasoline or fuel oil vapours from gas mixtures originating in relation to the operation of vehicle internal combustion engines, said process comprising passing the gas mixture consecutively through at least a first and a second adsorption system, the first system consisting of extrudated activated carbon (EAC) having a first adsorption rate for organic vapours and the second system consisting of activated carbon having a second adsorption rate for organic vapours, said second adsorption rate being higher than said first adsorption rate.

12. Process according to claim 11, wherein said EAC has an Sv of 1250–7000 $m^2/m^3$.

13. Process according to claim 12, wherein the particle size of the activated carbon in said second adsorption system is smaller than the particle size of the activated carbon in said first adsorption system.

14. Process according to claim 12, wherein said activated carbon from said second system has an Sv of 2000–30,000 $m^2/m^3$.

15. Process according to claim 14, wherein:

the activated carbon in both adsorption systems is based on the same material, with different ratio of external surface to volume;

the particle size of the activated carbon in said second adsorption system is smaller than the particle size of the activated carbon in said first adsorption system;

the pressure drop over the adsorbent in said first adsorption system is lower than the pressure drop over the adsorbent in said second adsorption system;

the loaded adsorption systems are regenerated by passing combustion air through the adsorption systems.

16. Process according to claim 11, wherein said activated carbon from said second system has an Sv of 2000–30,000 $m^2/m^3$.

17. Process according to claim 16, wherein the activated carbon in both adsorption systems is based on the same material, with different ratio of external surface to volume.

18. Process according to claim 11, wherein the pressure drop over the adsorbent in said first adsorption system is lower than the pressure drop over the adsorbent in said second adsorption system.

19. Process according to claim 11, wherein the loaded adsorption systems are regenerated by passing combustion air through the adsorption systems.

20. Process according to claim 11, wherein said activated carbon of the second system is granular.

21. Process for the removal of gasoline, kerosene or fuel oil vapours from gas mixtures originating in relation to the operation of vehicle internal combustion engines, said process comprising passing the gas mixture consecutively through at least a first and second adsorption system, the first system adsorption rate for organic vapours and the second system consisting of activated carbon having a second adsorption rate for organic vapours, said second adsorption rate being higher than said first adsorption rate, wherein the loaded adsorption systems are regenerated by passing combustion air through the adsorption systems.

22. Process according to claim 21, wherein said EAC has an Sv of 1250–7000 $m^2/m^3$.

23. Process according claim 22, wherein the particle size of the activated carbon in said second adsorption system is smaller than the particle size of the activated carbon in said first adsorption system.

24. Process according to claim 22, wherein said activated carbon from said second system has an Sv of 2000–30,000 $m^2/m^3$.

25. Process according to claim 21, wherein said activated carbon from said second system has an Sv of 2000–30,000 $m^2/m^3$.

26. Process according to claim 25, wherein the activated carbon in both adsorption systems is based on the same material, with different ratios of external surface to volume.

27. Process according to claim 21, wherein the pressure drop over the adsorbent in said first adsorption system is lower than the pressure drop over the adsorbent is said second adsorption system.

28. Process for the removal of gasoline, kerosene or fuel oil vapours from gas mixtures originating in relation to the operation of vehicle internal combustion engines, said process comprising passing the gas mixture consecutively through at least a first and a second adsorption system, the first system consisting of extrudated activated carbon (EAC) having a first adsorption rate for organic vapours and the second system consisting of activated carbon having a second adsorption rate for organic vapours, said second adsorption rate being higher than said first adsorption rate, wherein the loaded adsorption systems are regenerated by passing combustion air through the adsorption systems and the gas mixtures are selected from gases originating from gasoline, kerosene or fuel oil.

* * * * *

UNITED STATES PATENT AND TRADEMARK OFFICE
CERTIFICATE OF CORRECTION

PATENT NO. : 6,866,699 B2  Page 1 of 1
APPLICATION NO. : 10/204297
DATED : March 15, 2005
INVENTOR(S) : James Duff MacDowall et al.

It is certified that error appears in the above-identified patent and that said Letters Patent is hereby corrected as shown below:

Column 7, claim 7, line 15, "ratio" should read --ratios--;

Column 7, claim 15, line 46, "ratio" should read --ratios--;

Column 7, claim 15, line 54, "system;" should read --system; and--;

Column 8, claim 17, line 3, "ratio" should read --ratios--;

Column 8, claim 21, line 19, "system adsorption" should read --system consisting of extrudated activated carbon (EAC) having a first adsorption--; and Column 8, claim 27, line 42, "is said" should read --in said--.

Signed and Sealed this

Eighteenth Day of September, 2007

JON W. DUDAS
*Director of the United States Patent and Trademark Office*